United States Patent
Holtz et al.

(10) Patent No.: US 10,360,944 B2
(45) Date of Patent: Jul. 23, 2019

(54) SYSTEMS, METHODS, AND COMPUTER PROGRAM PRODUCTS FOR MULTIPLE ASPECT RATIO AUTOMATED SIMULCAST PRODUCTION

(71) Applicant: GVBB HOLDINGS S.A.R.L., Luxembourg (LU)

(72) Inventors: Alex Holtz, Jacksonville, FL (US); Robert J. Snyder, St. Augustine, FL (US); John R. Benson, Jacksonville, FL (US); William H. Couch, Fernandina Beach, FL (US); Marcel Larocque, Jacksonville, FL (US); Charles M. Hoeppner, Jacksonville, FL (US); Keith Gregory Tingle, Neptune Beach, FL (US); Richard Todd, Jacksonville, FL (US); Maurice Smith, Jacksonville, FL (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 16/105,358

(22) Filed: Aug. 20, 2018

(65) Prior Publication Data
US 2018/0358051 A1    Dec. 13, 2018

Related U.S. Application Data

(60) Continuation of application No. 14/986,435, filed on Dec. 31, 2015, now Pat. No. 10,056,111, which is a
(Continued)

(51) Int. Cl.
*H04N 5/268* (2006.01)
*G11B 27/031* (2006.01)
(Continued)

(52) U.S. Cl.
CPC .......... *G11B 27/031* (2013.01); *H04N 5/262* (2013.01); *H04N 5/268* (2013.01); *H04N 5/2628* (2013.01);
(Continued)

(58) Field of Classification Search
None
See application file for complete search history.

(56) References Cited

U.S. PATENT DOCUMENTS

| 4,232,311 A | 11/1980 | Agneta |
| 4,242,707 A | 12/1980 | Budai |

(Continued)

FOREIGN PATENT DOCUMENTS

| EP | 0239884 A1 | 10/1987 |
| EP | 0559478 A1 | 9/1993 |

(Continued)

OTHER PUBLICATIONS

EP Search Report Attached.
(Continued)

*Primary Examiner* — Eileen M Adams
(74) *Attorney, Agent, or Firm* — Arent Fox LLP

(57) ABSTRACT

A production system having a first production path, a second production path, and a control system that causes the first production path to generate a show in a first aspect ratio and the second production path to generate the same show in a second aspect ratio. Moreover, the product system can product a show from live material and from archived material. This aspect operates by producing a first show including multiple stories, segmenting the first show, and storing the show segments in an archive. Then, the system produces a second show using live portions as well as show segments retrieved from the archive. The product system can include a media manager that interacts with a server that may be
(Continued)

integrated with the production system. The media manager automatically assigns channels/ports of the server when accessing material stored in the server.

26 Claims, 6 Drawing Sheets

Related U.S. Application Data continuation of application No. 14/542,229, filed on Nov. 14, 2014, now Pat. No. 9,711,180, which is a division of application No. 10/434,461, filed on May 9, 2003, now Pat. No. 9,123,380.

(60) Provisional application No. 60/378,672, filed on May 9, 2002, provisional application No. 60/378,657, filed on May 9, 2002.

(51) Int. Cl.
| | |
|---|---|
| *H04N 5/262* | (2006.01) |
| *H04N 21/2187* | (2011.01) |
| *H04N 21/2665* | (2011.01) |
| *H04N 21/2343* | (2011.01) |
| *H04N 21/235* | (2011.01) |
| *H04N 21/4402* | (2011.01) |

(52) U.S. Cl.
CPC ..... *H04N 21/2187* (2013.01); *H04N 21/2358* (2013.01); *H04N 21/234372* (2013.01); *H04N 21/2665* (2013.01); *H04N 21/440272* (2013.01)

(56) References Cited

U.S. PATENT DOCUMENTS

| | | | |
|---|---|---|---|
| 4,272,790 A | 6/1981 | Bates | |
| 4,283,766 A | 8/1981 | Snyder et al. | |
| 4,400,697 A | 8/1983 | Currie et al. | |
| 4,488,180 A | 12/1984 | Rabinowitz | |
| 4,559,531 A | 12/1985 | Buynak | |
| 4,631,590 A | 12/1986 | Yamada et al. | |
| 4,689,683 A | 8/1987 | Efron | |
| 4,746,994 A | 5/1988 | Ettlinger | |
| 4,768,102 A | 8/1988 | O'Gwynn | |
| 4,972,274 A | 11/1990 | Becker et al. | |
| 4,982,346 A | 1/1991 | Girouard et al. | |
| 5,001,473 A | 3/1991 | Ritter et al. | |
| 5,036,395 A | 7/1991 | Reimers | |
| 5,115,310 A | 5/1992 | Takano et al. | |
| 5,122,885 A * | 6/1992 | Yoshioka | H04N 9/832 386/269 |
| 5,148,154 A | 9/1992 | MacKay et al. | |
| 5,166,797 A | 11/1992 | Angell | |
| 5,189,516 A | 2/1993 | Angell et al. | |
| 5,231,499 A | 7/1993 | Trytko | |
| 5,237,648 A | 8/1993 | Mills et al. | |
| 5,253,065 A | 10/1993 | Richards et al. | |
| 5,262,865 A | 11/1993 | Hertz | |
| 5,274,758 A | 12/1993 | Beitel et al. | |
| 5,307,456 A | 4/1994 | MacKay | |
| 5,347,622 A | 9/1994 | Takemoto et al. | |
| 5,369,443 A | 11/1994 | Woodham | |
| 5,384,912 A | 1/1995 | Ogrinc et al. | |
| 5,388,197 A | 2/1995 | Rayner | |
| 5,420,724 A | 5/1995 | Kawamura et al. | |
| 5,434,678 A | 7/1995 | Abecassis | |
| 5,442,749 A | 8/1995 | Northcutt et al. | |
| 5,450,140 A | 9/1995 | Washino | |
| 5,487,167 A | 1/1996 | Dinallo et al. | |
| 5,519,828 A | 5/1996 | Rayner | |
| 5,537,157 A * | 7/1996 | Washino | G06F 3/14 348/445 |
| 5,557,724 A | 9/1996 | Sampat et al. | |
| 5,559,641 A | 9/1996 | Kajimoto et al. | |
| 5,565,929 A | 10/1996 | Tanaka | |
| 5,577,190 A | 11/1996 | Peters | |
| 5,602,684 A | 2/1997 | Corbitt et al. | |
| 5,608,464 A | 3/1997 | Woodham | |
| 5,625,570 A | 4/1997 | Vizireanu et al. | |
| 5,638,133 A | 6/1997 | Squier et al. | |
| 5,641,596 A | 6/1997 | Gray et al. | |
| 5,659,792 A | 8/1997 | Walmsley | |
| 5,659,793 A | 8/1997 | Escobar et al. | |
| 5,664,087 A | 9/1997 | Tani et al. | |
| 5,680,639 A | 10/1997 | Milne et al. | |
| 5,682,326 A | 10/1997 | Klingler et al. | |
| 5,684,543 A | 11/1997 | Kobayashi | |
| 5,724,521 A | 3/1998 | Dedrick | |
| 5,737,011 A | 4/1998 | Lukacs | |
| 5,740,549 A | 4/1998 | Reilly et al. | |
| 5,752,238 A | 5/1998 | Dedrick | |
| 5,754,873 A | 5/1998 | Nolan | |
| 5,761,417 A | 6/1998 | Henley et al. | |
| 5,764,306 A | 6/1998 | Steffano | |
| 5,774,664 A | 6/1998 | Hidary et al. | |
| 5,778,181 A | 7/1998 | Hidary et al. | |
| 5,788,851 A | 8/1998 | Kenley et al. | |
| 5,790,117 A | 8/1998 | Halviatti et al. | |
| 5,794,210 A | 8/1998 | Goldhaber et al. | |
| 5,795,228 A | 8/1998 | Trumbull et al. | |
| 5,801,685 A | 9/1998 | Miller et al. | |
| 5,805,154 A | 9/1998 | Brown | |
| 5,825,427 A * | 10/1998 | MacLeod | H04N 7/0122 348/445 |
| 5,826,102 A | 10/1998 | Escobar et al. | |
| 5,833,468 A | 11/1998 | Guy et al. | |
| 5,848,396 A | 12/1998 | Gerace | |
| 5,852,435 A | 12/1998 | Vigneaux et al. | |
| 5,854,887 A | 12/1998 | Kindell et al. | |
| 5,872,565 A | 2/1999 | Greaves et al. | |
| 5,875,108 A | 2/1999 | Hoffberg et al. | |
| 5,877,781 A | 3/1999 | Tomizawa et al. | |
| 5,880,792 A | 3/1999 | Ward et al. | |
| 5,892,507 A | 4/1999 | Moorby et al. | |
| 5,892,767 A | 4/1999 | Bell et al. | |
| 5,892,915 A | 4/1999 | Duso et al. | |
| 5,918,002 A | 6/1999 | Klemets et al. | |
| 5,929,849 A | 7/1999 | Kikinis | |
| 5,930,446 A | 7/1999 | Kanda | |
| 5,931,901 A | 8/1999 | Wolfe et al. | |
| 5,987,501 A | 11/1999 | Hamilton et al. | |
| 5,999,912 A | 12/1999 | Wodarz et al. | |
| 6,006,241 A | 12/1999 | Pumaveja et al. | |
| 6,011,537 A | 1/2000 | Slotznick | |
| 6,018,768 A | 1/2000 | Ullman et al. | |
| 6,026,368 A | 2/2000 | Brown et al. | |
| 6,029,045 A | 2/2000 | Picco et al. | |
| 6,029,194 A | 2/2000 | Tilt | |
| 6,038,573 A | 3/2000 | Parks | |
| 6,061,056 A | 5/2000 | Menard et al. | |
| 6,064,967 A | 5/2000 | Speicher | |
| 6,084,581 A | 7/2000 | Hunt | |
| 6,084,628 A | 7/2000 | Sawyer | |
| 6,088,722 A | 7/2000 | Hers et al. | |
| 6,118,444 A | 9/2000 | Garmon et al. | |
| 6,119,098 A | 9/2000 | Guyot et al. | |
| 6,133,909 A | 10/2000 | Schein et al. | |
| 6,134,380 A | 10/2000 | Kushizaki | |
| 6,141,007 A * | 10/2000 | Lebling | G06F 17/30716 707/E17.093 |
| 6,144,375 A | 11/2000 | Jain et al. | |
| 6,146,148 A | 11/2000 | Stuppy | |
| 6,157,929 A | 12/2000 | Zamiska et al. | |
| 6,160,570 A | 12/2000 | Sitnik | |
| 6,182,050 B1 | 1/2001 | Ballard | |
| 6,185,538 B1 | 2/2001 | Schulz | |
| 6,185,621 B1 | 2/2001 | Romine | |
| 6,188,396 B1 | 2/2001 | Boezeman et al. | |
| 6,188,800 B1 | 2/2001 | Okitsu | |
| 6,198,477 B1 | 3/2001 | Kurtze et al. | |
| 6,198,906 B1 | 3/2001 | Boetje et al. | |

(56) References Cited

U.S. PATENT DOCUMENTS

| | | |
|---|---|---|
| 6,204,840 B1 | 3/2001 | Petelycky et al. |
| 6,211,869 B1 | 4/2001 | Loveman et al. |
| 6,216,112 B1 | 4/2001 | Fuller et al. |
| 6,223,211 B1 | 4/2001 | Hamilton et al. |
| RE37,342 E | 8/2001 | Washino et al. |
| 6,281,941 B1 | 8/2001 | Windrem |
| 6,289,378 B1 | 9/2001 | Meyer et al. |
| 6,315,572 B1 | 11/2001 | Owens et al. |
| 6,331,852 B1 | 12/2001 | Gould et al. |
| 6,398,556 B1 | 6/2002 | Ho et al. |
| 6,404,978 B1 | 6/2002 | Abe |
| 6,421,095 B1 | 7/2002 | Windrem |
| 6,437,802 B1 | 8/2002 | Kenny |
| 6,441,832 B1 | 8/2002 | Tao et al. |
| 6,442,529 B1 | 8/2002 | Krishan et al. |
| 6,452,598 B1 | 9/2002 | Rafey et al. |
| 6,452,612 B1 | 9/2002 | Holtz |
| 6,458,060 B1 | 10/2002 | Watterson et al. |
| 6,460,018 B1 | 10/2002 | Kasai et al. |
| 6,469,711 B2 | 10/2002 | Foreman et al. |
| 6,490,725 B2 | 12/2002 | Kikinis |
| 6,542,692 B1 | 4/2003 | Houskeeper |
| 6,604,242 B1 | 8/2003 | Weinstein et al. |
| 6,668,377 B1 | 12/2003 | Dunn |
| 6,760,916 B2 | 7/2004 | Holtz et al. |
| 6,763,523 B1 | 7/2004 | Sacilotto, Jr. et al. |
| 6,804,825 B1 | 10/2004 | White et al. |
| 6,909,874 B2 | 6/2005 | Holtz |
| 6,952,221 B1 | 10/2005 | Holtz |
| 7,024,677 B1 | 4/2006 | Snyder et al. |
| 7,034,886 B2 | 4/2006 | Ross et al. |
| 7,177,520 B2 | 2/2007 | Zetts |
| 7,181,523 B2 | 2/2007 | Sim |
| 7,549,128 B2 | 6/2009 | Snyder et al. |
| 9,558,786 B2 | 1/2017 | Holtz et al. |
| 2001/0003846 A1 | 6/2001 | Rowe et al. |
| 2001/0032333 A1 | 10/2001 | Flickinger |
| 2002/0053078 A1 | 5/2002 | Holtz et al. |
| 2002/0054244 A1 | 5/2002 | Holtz et al. |
| 2002/0067730 A1 | 6/2002 | Hinderks et al. |
| 2002/0083472 A1 | 6/2002 | Hirayama |
| 2002/0109710 A1 | 8/2002 | Holtz et al. |
| 2002/0113803 A1 | 8/2002 | Samra et al. |
| 2002/0120925 A1 | 8/2002 | Logan |
| 2002/0170068 A1 | 11/2002 | Rafey et al. |
| 2002/0171649 A1 | 11/2002 | Fogg |
| 2003/0066070 A1 | 4/2003 | Houston |
| 2003/0070167 A1 | 4/2003 | Holtz et al. |
| 2003/0131359 A1 | 7/2003 | Moskowitz |
| 2003/0141665 A1 | 7/2003 | Li |
| 2003/0206662 A1 | 11/2003 | Avinash et al. |
| 2003/0206720 A1 | 11/2003 | Abecassis |
| 2003/0217362 A1 | 11/2003 | Summers et al. |
| 2004/0005004 A1 | 1/2004 | Demos |
| 2004/0073953 A1 | 4/2004 | Xu et al. |
| 2004/0103439 A1 | 5/2004 | Macrae et al. |
| 2004/0210945 A1 | 10/2004 | Snyder et al. |
| 2004/0095829 A1 | 11/2004 | Thomson |
| 2004/0228605 A1 | 11/2004 | Quan et al. |
| 2004/0237122 A1 | 11/2004 | Yamaguchi et al. |
| 2005/0028217 A1 | 2/2005 | Marler et al. |
| 2005/0084232 A1 | 4/2005 | Herberger et al. |
| 2008/0016532 A1 | 1/2008 | Wang |
| 2008/0028340 A1 | 1/2008 | Davis |

FOREIGN PATENT DOCUMENTS

| | | |
|---|---|---|
| EP | 0774756 A2 | 5/1997 |
| EP | 0817474 A1 | 1/1998 |
| EP | 0929197 A2 | 7/1999 |
| EP | 0933893 A1 | 8/1999 |
| EP | 1126712 A2 | 8/2001 |
| EP | 1262063 A2 | 12/2002 |
| GB | 2323699 A | 9/1998 |
| JP | 265677 | 10/1989 |
| JP | 276160 | 10/1998 |
| JP | 11266422 A | 9/1999 |
| WO | 8707108 A1 | 10/1987 |
| WO | 9722204 A1 | 6/1997 |
| WO | 9845789 A1 | 10/1998 |
| WO | 9845792 A1 | 10/1998 |
| WO | 9905821 A2 | 2/1999 |
| WO | 0072574 A2 | 11/2000 |
| WO | 2001011627 | 2/2001 |
| WO | 0152526 A2 | 7/2001 |
| WO | 02087244 A1 | 10/2002 |
| WO | 2004095829 A1 | 11/2004 |

OTHER PUBLICATIONS

Burghardt, J., "Das Sony-News-System," Fernseh Und Kinotechnik, Vde Verlag Gmbh, vol. 50, No. 11, pp. 641-642 and 644-646 (Nov. 1, 1996).

English-language translation of Sections 1, 2 and 3.7 of Burghardt, J, "Das Sony-News-System," Fernseh Und Kinotechnik, Vde Verlag Gmbh, 4 Pages (Nov. 1, 1996).

Avatar and ParkerVision Streamline Broadcast News Production Process: Reducing Costs, Radio-Television News Directors Association, at http://www.aystartnews.com/news/narker.html, 3 pages (Sep. 29, 1999).

Avatar BCS, at http://www.avstarnews.com/products/bcs/bcs over.html, 2 pages (last visited Oct. 2, 1999).

Avatar Fact Sheet, at http://www.avstarnews.com/about/facts.html, 2 pages (last visited Oct. 2, 1999).

Avatar MBS, at http://www.avstarnews.com/nroducts/mbs/mbs_ over html, 1 page (last visited Oct. 2, 1999).

Avatar Products, at http://www.aystarnews.com/oroducts/oroducts.html, 1 page, (last visited Oct. 2, 1999).

Avatar Broadcast Control System, available at http://www.avstarnews.com/products/bcp/bcs_over.html, 2 pages (last visited Oct. 2, 1999).

Avatar Media Browse System, available at http://www.avstarnews.com/products/mbs/mbs over.html, 2 pages (last visited Oct. 2, 1999).

Avatar' Newsroom Computer System, available at http://www.avstarnews.com/products/ncs/ncs over.html 2 pages (last visited Oct. 2, 1999).

Complete Seamless Integration, at http://www.play.com/trinitvNLE/complete.html, 2 pages (last visited Oct. 14, 1999).

Edit. Sweet., at http://www.play.com/trinitvNLE/edit.html (last visited Oct. 14, 1999).

Gizmos98 Home Page, at http:/www.play.com/products/gizmos/index.html, 2 pages (last visited Oct. 14, 1999).

GlobalCast Communications, Inc.—Solutions, GlobalCast Communications, at http://www.gcast.com/solutions.shtml, 2 pages (last visited Oct. 15, 1999).

GlobeCaster, at http://www.play.com/products/globecaster/index.html, 2 pages (last visited Oct. 14, 1999).

HP Teams With ISVs to Complete Solution Portfolio for Internet Service Providers, GlobalCast Communications, at http://www.qcast.com/press/11.shtml, 2 pages (Sep. 28, 1998).

LeaderPlus, at http://www.avstarnews.com/products/leader/leader_over.html, 2 pages (last visited Oct. 2, 1999).

Lucent Technologies and GlobalCast Communications Form Strategic Partnership in Reliable Multicast Market, GlobalCast Communications, at http://www.gcast.com/press/2.shtml, 2 pages (Aug. 25, 1997).

Newsroom Computer System, at http://www.avstarnews.com/products/ncs/ncs_over.html, 2 pages (last visited Oct. 2, 1999).

Play Incorporated Announces Do-It-Yourself Internet Studio, at http://www.play.com/news/111698-globecaster.html, 2 pages (Nov. 19, 1998).

Play Incorporated Announces Trinity Live, A Live Production System Based on Advanced Digital Component Switcher and Real-Time Trinity Architecture, at http://www.play.com/news/091099.html, 2 pages (Sep. 10, 1999).

Product Features, at http://www.Play.com/products/globecaster/features.html, 1 Page (last visited Oct. 15, 1999).

(56) References Cited

OTHER PUBLICATIONS

Products at http://www.play.com/products/index.html. 2 pages (last visited Oct. 14, 1999).
Products: Trinity, at http://www.play.com/products/trinity/index/html, 1 page (last visited Oct. 14, 1999).
Products: Trinity: Digital Effects, at http://www.play.com/products/trinity/digital.html, 2 pages (last visited Oct. 14, 1999).
Products: Trinity: Editor, at http://www.play.com/products/trinity/editor.html, 1 page (last visited Oct. 14, 1999).
Products: Trinity: Switcher, at http://www.play.com/products/trinity/switcher.html, 2 pages (last visited Oct. 14, 1999).
Products: Trinity: Technical Specifications, at http://www.play.com/products/trinity/techspecs.html, 1 page (last visited Oct. 14, 1999).
RealProducer Plus G2, at http://www.real.com/products/tools/producerplus/index.html, 3 pages (last visited Oct. 15, 1999).
RealProducer Plus G2 Documentation, at http://www.real.com/products/tools/producerplus/docs.html, 3 pages (last visited Oct. 15, 1999).
System Requirements, at http://www.play.com/broducts/globecaster/sysreq.html, 1 page last visited Oct. 15, 1999).
Technical Engineer Speak Specs, at http://www.play.com/trinityNLE/tech.html, 2 pages (last visited Oct. 14, 1999).
Trinity-NLE is Herel, at http://www.play.com/news/100499.html, 2 pages (last visited Oct. 15, 1999).
Trinity University Opens, at http://wwww.play:com/news/121797.html, 1 page (last visited Oct. 15, 1999).
Video Production, at http://www.winningpost.com.au/html/video_production.html, 1 page (last visited Oct. 14, 1999).
Wolfe, M.,Television Stations, Production Companies Appreciate Trinity's Impressive Features, Low Cost, at http://www.play.com/news/090299.html, 2 pages (Sep. 2, 1999).
Wolfe, M., USA Today Runs Extensive Story About GlobeCaster, at http://www.play.com/news/061699.html, 2 pages (Jun. 16, 1999).
International Search Report for Appl. No. PCT/US01/00547 dated Aug. 28, 2001, 10 Pages.
International Search Report for Appl. No. PCT/US01/10306 dated Jan. 18, 2002, 6 Pages.
ADC-100, available at http://www.louth.com/products/adc100_info.htm, 2 pages (Jul. 13, 1998).
Ahanger, G. and Little, T., "Automatic Composition Techniques for Video Production," IEEE Transactions on Knowledge and Data Engineering, IEEE, vol. 10, No. 6, Nov./Dec. 1998, pp. 967-987.
AirBoss: Airtime Broadcast Automation, [retrieved on Jul. 13, 1998] at http://www.florical.com/airboss.html, 1 page.
CameraMan Studio, CSS-2000-N/P, ParkerVision, Apr. 1997, 2 pages.
CameraMan Studio System II Broadcast Production Systems, CSS-2000, CSS-2313, CSS-2017, ParkerVision, Oct. 1997, 2 pages.
Declaration of Alex Holtz under 35 U.S.C. S 1.56, Feb. 2, 2001, 6 pages.
Hartford, S:, "Overcoming Current Limitations of Personal Computers in Replacing Traditional Video Production Equipment," SMPTE Journal, Jan. 1998, pp. 58-64.
Cataldo, C., "Louth Provides the Automation Solution for HBO, New York," Louth Automation Quarterly News, vol. 1, Issue 3, Oct. 1997, 4 pages.
Judy, T.A. (Ed.), "Louth Provides Satellite Program Acquisition System to CNBC-TV, New Jersey," LOUTH Automation Quarterly News, vol. 1, Issue 4, Jan. 1998, 4 pages.
Judy, T.A. (Ed.). "Louth Provides Fully Digital Solution for Foxtel, Australia," LOUTH Automation Quarterly News, vol. 1, Issue 5, Mar. 1998, 4 pages.
Matt Cristy, "ParkerVision puts together $100,000 exhibit for show", Apr. 7, 1997, Business Journal of Jacksonville, pp. 1-2.
"Overview," Yahoo!® Broadcast [online], 2000 [retrieved Apr. 26, 2001]. Retrieved from the Internet: <URL: http://business.broadcast.com/overview.html, 2 pages.
Wine, W., Dr., "What is I Love TV™?," iLoveTV Inc. [online], [retrieved Jun. 12, 2001]. Retrieved from the Internet: >URL: http://209.47.14.231/whatis.html, 1 page.

"Welcome to Yahoo! Radio," Yahoo!® Radio [online], [retrieved Apr. 26, 2001]. Retrieved from the Internet:>URL: http://radio.broadcast.com/, 2 pages.
International Search Report for Appln. No. PCT/US02/14427 dated Oct. 17, 2003, 6 pages.
International Search Report for Appln. No. PCT/US01/00547, dated Aug. 28, 2002, 10 pages.
International Preliminary Examination Report dated May 3, 2002 regarding PCT/US2001/00547.
International Search Report for Appln. No. PCT/US01/10306, dated Jan. 18, 2002, 6 pages.
International Preliminary Examination Report dated Apr. 5, 2002 regarding PCT/US2001/10306.
U.S. Appl. No. 09/482,683, dated Jan. 14, 2000, Holtz et al.
U.S. Appl. No. 09/488,578, dated Jan. 21, 2000, Snyder et al.
U.S. Appl. No. 09/634,735, dated Aug. 8, 2000, Snyder et al.
U.S. Appl. No. 09/822,855, dated Apr. 2, 2001, Holtz et al.
U.S. Appl. No. 09/832,923, dated Apr. 12, 2001, Holtz et al.
U.S. Appl. No. 09/836,239, dated Apr. 18, 2001, Holtz et al.
U.S. Appl. No. 10/208,810, dated Aug. 1, 2002, Holtz et al.
U.S. Appl. No. 10/247,783, dated Sep. 20, 2002, Holtz et al.
U.S. Appl. No. 10/431,576, dated May 8, 2003, Snyder et al.
U.S. Appl. No. 10/434,458, dated May 9, 2003, Snyder et al.
U.S. Appl. No. 10/434,460, dated May 9, 2003, Snyder et al.
U.S. Appl. No. 10/434,461, dated May 9, 2003, Holtz et al.
Judy, T.A. (Ed.), "Telemadrid Chooses Louth for Multi-Channel Automation System," LOUTH Automation Quarterly News, vol. 1, Issue 6, Jul. 1998, 4 pages.
Judy, T.A. (Ed.). Louth Automation: Quarterly News, vol. 1, Issue 2, Jul. 1997.
Judy, T.A. (Ed.). Louth Automation: Quarterly News, vol. 1, Issue 3, Oct. 1997.
Judy, T.A. (Ed.). Louth Automation: Quarterly News, vol. 1, Issue 4, Jan. 1998.
Judy, T.A. (Ed.). Louth Automation: Quarterly News, vol. 1, Issue 5, Mar. 1998.
Judy, T.A. (Ed.). Louth Automation: Quarterly News, vol. 1, Issue 6, Jul. 1998.
Judy, T.A. (Ed.), AUTOSAT Provides Downlink Control for WKYC, LOUTH Automation Quarterly News, vol. 1, Issue 2, Jul. 1997, 4 pages.
Maar, J., "Newscast Without A Crew," Television Broadcast, Oct. 1998, 1 page.
NewsRepeater: Automated News Channel, (retrieved on Jul. 13, 1998) at http://www.florical.com/newsrepeater.html, 1 page.
ParkerVision Beta License Agreement for CameraMan STUDIO Systems, ParkerVision, Dec. 19, 1997.
Presentation Automation, The Powerful and Flexible Windows Based Solution (Copyright 1995, 1996), (retrieved on Jul. 14, 1998) at http://www.pro-bel.com/corporate/pro-bel_software/products/automation/cp-4000.htm, 3 pages.
Pro-Bel Software: Procion AV-Workbench (Copyright 1995-1998), (retrieved on Jul. 14, 1998) at http://www.pro-bel.com/corporate/pro-bel.ltd/products/ShortForm/page3.htm, 8 pages.
ParkerVision 1997 Annual Report.
Product Information (last revised Jun. 17, 1998), [retrieved on Jul. 13, 1998] at http://www.louth.com/products/index.htm, 1 page.
Products: Integrated Money Making Systems, at http://www.florical.com/products.html, 2 pages (last visited Jul. 13, 1998).
ShowTimer: PreAir Automation, at http://wwww.florical.com/showtimer.html, 1 page (last visited Jul. 13, 1998).
Slack, P.A. et al., "An Integrated Video Production System," International Broadcasting Convention, Sep. 12-16, 1996, pp. 403-408.
SpotCacher-Video Server and Cache Management, at http://www.florical.com/spotcacher.html, 1 page (last visited Jul. 13, 1998).
Station Automation—Now It's A Snap! (Copyright 1995, 1996), Pro-Bel Ltd., at http://www.pro-bel.com/corporate/pro-bel software/products/automation, 2 pages (last visited Jul. 14, 1998).
TimeShifter:Tape/Disk Network Delay,at http://www.florical.com/timeshifter.html, 1 page (last visited Jul. 13, 1998).
Video Server Management System (Copyright 1995, 1996), Pro-Bel Ltd., at http://www.pro-bel.com/corporate/pro-bel software/products/mapp, 4 pages (last visited Jul. 14, 1998).

(56) References Cited

OTHER PUBLICATIONS

Vigneaux, S., "The Integration of a Newsroom Computer System with a Server-Centred News Production System," International Broadcasting Convention, Sep. 12-16, 1996, pp. 512-518.
English-language Abstract of JP 10-065936, published Mar. 6, 1998, from http://wwwl.ipdl.jpo.go.jp, 2 Pages (last visited May 20, 2002).
"About Yahoo! Broadcast," Yahoo!® Broadcast [online], 2000 [Retrieved Apr. 26, 2001]. Retrieved from the Internet: URL: http://business.broadcast.com/about2.html, 1 page.
"Advantages," Yahoo!® Broadcast [online], 2000 [retrieved on Apr. 26, 2001]. Retrieved from the Internet:URL: http://business.broadcast.com/advantages.html, 3 pages.
"Content and Conversation," Yahoo!® Broadcast [online] [retrieved on Apr. 26, 2001]. Retrieved from the Internet: <URL: http:business.broadcast.com/sanders_sprint/frameset/html, 1 page.
Festa, P., "Flood of spending due for streaming video," Yahoo!® News [online), Apr. 12, 2001 [retrieved Apr. 26, 2001). Retrieved from the Internet<URL: http://dailynews.yahoo.com/h/cn/20010412/tc/flood_of_spending_due_for_streaming_video_1.html, 2 pages.
Manes, G., "Yahoo! Joins Suddenly Crowded Online Music Field," AOL Personal Finance (online), Apr. 5, 2001 (retrieved Apr. 26, 2001). Retrieved from the Internet<URL: http://aol.thestreet.com/tech/internet/1379000.html, 3 pages.
Mannes, G., "Chasing Sweet Smell of Success Takes Yahoo! To Hollywood," AOL Personal Finance (online), Apr. 17, 2001 (retrieved Apr. 26, 2001). Retrieved from the Internet<URL: http://aol.thestreet.com/tech/internet/1393298.html, 3 pages.
"Changing the Delivery of Business Communications," Yahoo!® Broadcast (online), 2000 [retrieved Apr. 26, 2001]. Retrieved from the Internet: <URL: http://business/.broadcast.com/overview.html, 2 pgs.
Weisman, R., "Yahoo's Latest: New Broadcast Site," Yahoo!® News (online), Apr. 23, 2001 (retrieved Apr. 26, 2001). Retrieved from the Internet :<URL: http://dailynews.yahoo.com/h/nf/20010423/tc/9176_1.html, 3 pages.
"Webcasting 101," Yahoo!® Broadcast [online], 2000 [retrieved Apr. 26, 2001]. Retrieved from the Internet<URL: http://business.broadcast.com/webcasting101.html, 3 pages.
"Welcome," Yahoo!® Broadcast (online), 2000, [retrieved Apr. 26, 2001]. Retrieved from the Internet<URL: http://business.broadcast.com, 1 page.

"Welcome to Yahoo! Broadcast," Yahoo!® Broadcast (online), 2001 (retrieved Apr. 26, 2001). Retrieved from the Internet:AiRL: http://mediaframe.yahoo.com/launch?lid=wmv-56-p.902530-41362.wmv-100-p.902531-4136 . . . /index2html, 1 page.
Humphries, M., "The Options.," iLoveTV Inc. (online), [retrieved Jun. 12, 2001]. Retrieved from the Internet:URL: http://209.47.14.231/possiblel.html, 1 page.
Wine, W., Dr., "The Benefits," iLoveTV Inc. (online), (retrieved Jun. 12, 2001). Retrieved from the Internet:>URL: http://209.47.14.231/benefit.html, 1 page.
"Contact Us," iLoveTV Inc. [online], [retrieved Jun. 12, 2001]. Retrieved from the Intemet:>URL: http://209.47.14.231/contact.html, 1 page.
"Press Releases," iLoveTV Inc.(online], Jun. 5, 2001 [retrieved Jun. 12, 2001]. Retrieved from the Internet:>URL: http://209.47.14.231/press.html, 1 page.
Park, I., "I Love TV: Cutting Edge Technology Unites the Power of Television and the Internet," iLoveTV Inc. [online], Jun. 5, 2001 [retrieved Jun. 12, 2001]. Retrieved from the Internet:>URL: http://209.47.14.231/press_cuttingEdge.html, 2 pages.
"Yahoo to Unveil New Broadcast Site," Yahoo!® News [online], Apr. 23, 2001 [retrieved Apr. 26, 2001]. Retrieved from the Internet:>URL: http://dailynews.yahoo.com/h/nm/20010423/tc/yahoo_broadcast_dc_1.html, 2 pages.
"Yahoo! Events," Yahoo!!® Events [online], Apr. 26, 2001 [retrieved Apr. 26, 2001]. Retrieved from the Internet:>URL: http://events.yahoo.com/, 2 pages.
International Search Report for Appln. No. PCT/US02/12048 dated Sep. 18, 2002, 6 pages.
International Search Report for Appln. No. PCT/US02/24929 dated Dec. 4, 2002, 6 pages.
International Search Report for Appln. No. PCT/US02/29647 dated Dec. 11, 2002, 8 pages.
Synchronized Multimedia Working Group: "Synchronized Multimedia Integration Language (SMIL) 1.0 Specification" World Wide Web Consortium, Online 15=Jun. 1998, XP002934899.
ParkerVision, CameraManSTUDIO, Preliminary Sales Manual, SSM-963-001-KKM, Sep. 18, 1996, pp. 1-29.
ParkerVision, Preliminary Sales Manual, SSM-963-001-KKM, Product Pricing, Sep. 18, 1996, pp. 1-54.
Synergy Series Aspectizer Q&A v1.0, Ross Video Limited, 2001.

\* cited by examiner

SYSTEMS, METHODS, AND COMPUTER PROGRAM PRODUCTS FOR MULTIPLE ASPECT RATIO AUTOMATED SIMULCAST PRODUCTION

CROSS-REFERENCE TO RELATED APPLICATIONS

This application is a continuation of and claims the benefit of U.S. patent application Ser. No. 14/986,435 entitled "SYSTEMS, METHODS, AND COMPUTER PROGRAM PRODUCTS FOR MULTIPLE ASPECT RATIO AUTOMATED SIMULCAST PRODUCTION" and filed Dec. 31, 2015, which is a continuation of U.S. patent application Ser. No. 14/542,229 (now U.S. Pat. No. 9,711,180) entitled "SYSTEMS, METHODS, AND COMPUTER PROGRAM PRODUCTS FOR AUTOMATED REAL-TIME EXECUTION OF LIVE INSERTS OF REPURPOSED STORED CONTENT DISTRIBUTION" and filed Nov. 14, 2014, which is a divisional of Ser. No. 10/434,461 (now U.S. Pat. No. 9,123,380) entitled "SYSTEMS, METHODS, AND COMPUTER PROGRAM PRODUCTS FOR AUTOMATED REAL-TIME EXECUTION OF LIVE INSERTS OF REPURPOSED STORED CONTENT DISTRIBUTION, AND MULTIPLE ASPECT RATIO AUTOMATED SIMULCAST PRODUCTION" filed May 9, 2003, which claims the benefit of U.S. Provisional Application Ser. No. 60/378,657 entitled "Automated Real-Time Execution of Live Inserts of Repurposed Stored Content Distribution" and filed May 9, 2002, and U.S. Provisional Application Ser. No. 60/378,672 entitled "Multiple Aspect Ratio Automated Simulcast Production" and filed May 9, 2002, the entire contents of each of which is herein incorporated by reference in their entireties.

The following patents and patent applications of common assignee are related to the present application, and are herein incorporated by reference in their entireties:

"Real Time Video Production System and Method," Ser. No. 09/215,161, filed Dec. 18, 1998, now U.S. Pat. No. 6,452,612, issued Sep. 17, 2002.

"System and Method for Real Time Video Production and Multicasting," Ser. No. 09/634,735, filed Aug. 8, 2000.

"Method, System and Computer Program Product for Full News Integration and Automation in a Real Time Video Production Environment," Ser. No. 09/822,855, filed Apr. 2, 2001.

"Method, System and Computer Program Product for Producing and Distributing Enhanced Media Downstreams," Ser. No. 09/836,239, filed Apr. 18, 2001.

"Advertisement Management Method, System, and Computer Program Product," Ser. No. 10/247,783, filed Sep. 20, 2002.

BACKGROUND OF THE INVENTION

Field of the Invention

The present invention relates generally to production of live and as-live shows, and more particularly relates to production of live and as-live shows using live segments and re-purposed archived materials.

Related Art

The demand for 24-hour news programming is high, and growing steadily. Conventional systems and methods of producing news shows are labor extensive and, thus, expensive. What is needed are improved automated systems and methods for providing news programming that is less labor intensive and less expensive.

SUMMARY OF THE INVENTION

Briefly stated, the present invention is directed to a system, method, and computer program product for producing a show. In an embodiment, the invention is directed to a production system having a first production path, a second production path, and a control system that causes the first production path to generate a show in a first aspect ratio (4:3), and that causes the second production path to generate the same show in a second aspect ratio (16:9).

In another embodiment, the invention is directed to producing a show from live material and from archived material. This aspect of the invention operates by producing a first show comprising a plurality of stories, segmenting the first show, and storing the show segments in an archive. Then, the invention produces a second show using live portions as well as show segments retrieved from the archive.

The invention is also directed to a media manager that interacts with a server. In some cases, the server is integrated with the production system. The media manager automatically assigns channels/ports of the server when accessing material stored in the server.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is generally indicated by the leftmost digit(s) in the corresponding reference number.

BRIEF DESCRIPTION OF THE DRAWINGS/FIGURES

The invention shall be described with reference to the accompanying figures, wherein.

DETAILED DESCRIPTION OF THE INVENTION

Multiple Aspect Ratio Automated Simulcast Production

Figure 1:
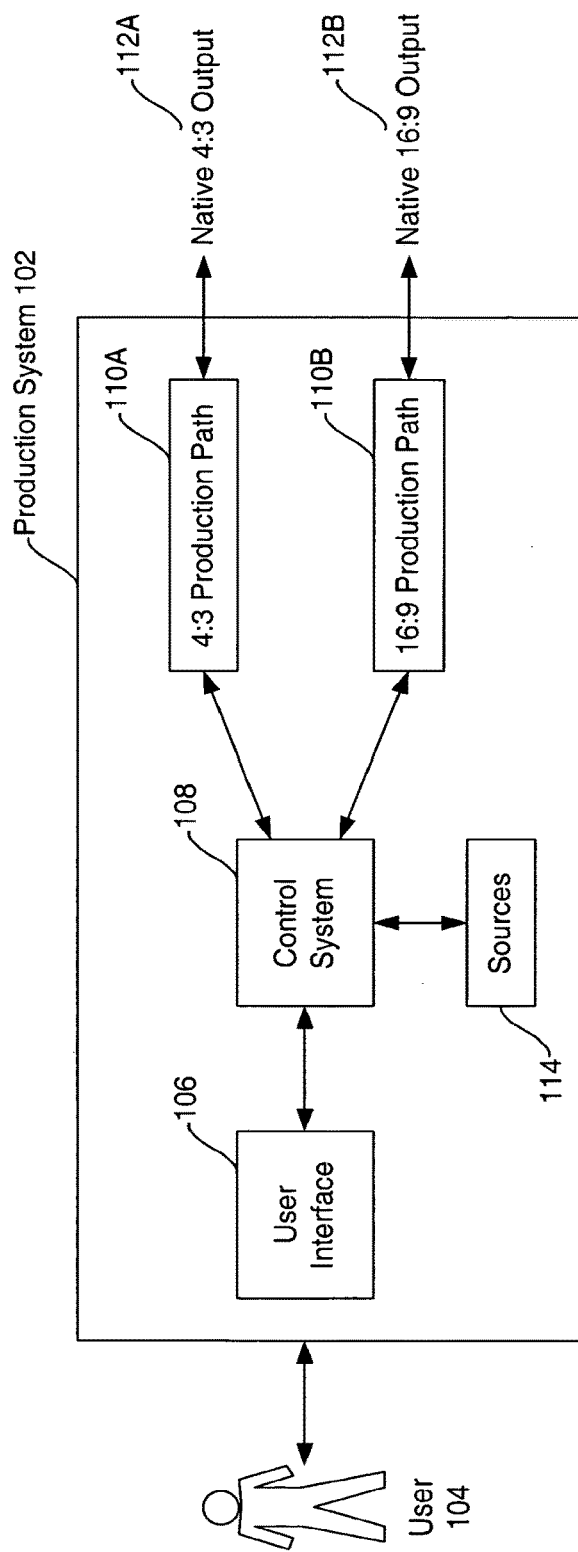
FIG. 1 is an example production system useful for simultaneously generating outputs in native 4:3 format and native 16:9 format.

The invention is directed to a method, system, and computer program product for simulcasting digital video through outputs having differing format requirements. As described in greater detail below, in an embodiment, the present invention allows broadcasters to automate and produce a simulcast of dual 4:3 and 16:9 aspect ratio "live" or "as-live"

programming. The present invention allows automatic adjustments to be made to character generators, still stores, transition effects, etc., such that the production can be synchronized and transmitted over parallel mediums with non-substantial delay.

Overview

The market for digital television continues to evolve as broadcasters transition from transmitting an analog NTSC signal to digital signals as mandated by the Federal Communications Commission (FCC). The mass majority of the installed television sets in the United States today have a 4:3 aspect ratio. New digital sets will come with the wider 16:9 aspect ratio similar to the format used in motion pictures Market analysts expect the installed base of digital television sets to be at 4.2 million by the end of 2002. In addition, digital settop boxes that receive the broadcast digital signal either over-the-air or through cable for conversion onto existing analog television sets are expected to have an installed base of 39.5 million. Television households by the end of 2002 are forecasted to be at 104.5 million. This shows a market penetration of 4% for digital television sets (16:9) and 38% for digital settop boxes (4:3). By the year 2005, the market penetration numbers will change for digital television sets from 4% to 17% while digital settop boxes change from 38% to 77%. This means that consumers will go through a period whereby many will be looking for a 16:9 format signal from broadcasters versus the standard 4:3 format currently used with analog television sets.

The broadcaster will be challenged to deliver several different types of programming solutions as follows:

4:3 original ("native") output "letter boxed" to fit a 16:9 digital television set. The letter box could be "black" or contain text, data or graphic content.

16:9 original ("native") output sent out "as is" for display on 16:9 digital television sets.

16:9 original ("native") output "cropped" to fit into a 4:3 analog television set with digital settop box converter.

In several of the cases above, compromises exist in order to serve the consumer during the market transition from a 4:3 to a 16:9 aspect ratio format. For example, some televisions include circuitry to convert from one format to another. However, such conversions introduce artifacts and negative impact resolution and/or the viewing experience. It is preferable that televisions receive and use signals in their original, or native, formats.

Therefore, a need exists to automate the process of producing simultaneous 4:3 and 16:9 formats from a single user interface to avoid duplicating both equipment and personnel resources. The simultaneous native output of both formats allow the broadcaster to design a "look and feel" that better enables them to take advantage of both 4:3 and 16:9 aspect ratios without negatively impacting one over the other.

The invention is applicable to formats other than 4:3 and 16:9, and is also applicable to the processing of greater than two formats, as will be appreciated by persons skilled in the relevant arts based on the teachings contained herein.

DETAILED DESCRIPTION

The invention allows broadcasters to automate and produce the simulcast of dual 4:3 and 16:9 aspect ratio "live" and "as-live" programming. FIG. 1 is a block diagram of a production system 102 according to an embodiment of the invention. The production system 102 includes a user interface 106, to enable interaction with users 104. Through the user interface 106, users 104 can design and produce shows, such as but not limited to live and as-live shows.

The production system 102 includes a control system 108, which controls the production system 102 (and components thereof) in the manner described herein. The control system 108 is implemented using a computer operating according to software. Such software, when stored on a computer readable medium (such as a CD, tape, hard drive, signals traveling over a wired or wireless medium, etc.), is referred to as computer program product. The invention is directed to such computer program products, as well as methods embodied in such computer program products, and systems incorporating such computer program products. Alternatively, the control system 108 is implemented using predominately hardware (such as hardware state machines or application specific processors).

The production system 102 includes a number of production paths 110. In the example shown in FIG. 1, such production paths 110 include a 4:3 production path 110A and a 16:9 production path 110B. These examples are provided for illustrative purposes only, and are not limiting. The invention is applicable to other formats. Also, the invention can accommodate more than two production paths.

The production system 102 also includes a number of sources 114, which may be cameras, tape machines, still stores, etc. The sources 114 provide material for the show to the production paths 110, either directly or via the control system 108.

In operation, the control system 108 controls the 4:3 production path 110A to generate a show in a native 4:3 format, to thereby generate a native 4:3 output 112A. Also, the control system 108 controls the 16:9 production path 110B to generate a show in a native 16:9 format, to thereby generate a native 16:9 output 112B. In an embodiment, the control system 108 simultaneously controls the 4:3 production path 110A and the 16:9 production path 110B such that the native 4:3 output 112A and the native 16:9 output 112B are synchronized with each other. In practice, the outputs 112A, 112B may not be precisely synchronized with each other, but are sufficiently synchronized so that any offset from each other is not easily discernable by viewers (or are at least are not sufficiently distracting to viewers).

In an embodiment, the production system 102 is similar to that described in "Real Time Video Production System and Method," Ser. No. 09/215,161, filed Dec. 18, 1998, now U.S. Pat. No. 6,452,612, issued Sep. 17, 2002, referenced above (although the invention can be implemented using any production system having the functionality described herein). However, the production system 102 is modified to include multiple production paths 110, and the control system 108 is modified to control the multiple production paths 110. Further information regarding the production system 102 is provided below.

Transition Macros for Controlling Multiple Production Paths

The invention uses a Transition Macro to achieve the functionality described herein. A transition macro is a set of video production commands, where each video production command is transmitted from a processing unit to a video production device. A user designs a production by combining one or more transition macros in a script. Execution of the transition macros cause the production system 102 to produce the show in accordance with the script.

Transition macros are described in great detail in U.S. Pat. No. 6,452,612, "Real Time Video Production System and Method," referenced above.

The '612 patent describes transition macros as controlling elements in a single production path. In the present invention, transition macros control elements in multiple production paths 110. For example, in the example of FIG. 1, a given transition macro controls elements in both the 4:3 production path 110A and the 16:9 production path 110B (although some transition macros may still be limited to a subset of the production paths 110). This feature of the invention is further described below.

Material for Multiple Formats

In an embodiment, the production system 102 includes material in the native formats for each of the system 102's production paths 110. For example, for a given still, the production system 102 includes a 4:3 version of the still, and a 16:9 version of the still. The production paths 110A, 110B may each include a dedicated still store, or may share a still store. Another example relates to cameras. In an embodiment, the 4:3 production path 110A includes 4:3 format cameras, and the 16:9 production path 110B includes 16:9 format cameras. Such duplicity is generally (but not always) the case for the production paths 110, to enable generation of the outputs 112 in the multiple native formats.

For example, consider the case of mixed effect (ME) banks. In embodiments of the invention, the production system 102 includes ME banks dedicated for the 4:3 production path 110A, and other ME banks dedicated for the 16:9 production path 110B.

A number of methods for acquiring materials for the production (in the different formats) are used, depending on a number of factors such as cost, availability, material types, as well as other implementation dependent factors. For example, in an embodiment, field acquisitions will originally be in 16:9 format, since that format will capture more data (when compared to 4:3). The 16:9 raw footage will then be used to create 4:3 format material (via appropriate cropping, for example). The result will be two separate files, one in 16:9 format, and one in 4:3 format. Since both files were created prior to production, it is possible to optimize both for their respective uses (i.e., one for producing a 4:3 output, and one for producing a 16:9 output). In another embodiment, field acquisitions are obtained in multiple original formats.

Such operation of the invention is in contrast to many conventional post-production conversion techniques, which try to convert a 16:9 signal to a 4:3 signal (or vice versa). Since such cropping is performed post-production, the cropping is not specifically tailored to the characteristics and parameters of the target format.

Processing Applicable Format

As noted above, the production paths 110 include components that are dedicated to their operation. In practice, each production path 110 may include a dedicated component, or they may share a single component. For example, in some embodiments, the production paths 110 may each include character generator (CG) and still store components, or they may share the same character generator (CG) and still store components.

In an embodiment, all files are identified as being in either 4:3 format or 16:9 format (for example, each file may include meta data that denotes the applicable format). When the 4:3 production path 110A accesses material, it ensures that it accesses files tagged as being in the 4:3 format. Similarly, when the 16:9 production path 110B accesses material, it ensures that it accesses files tagged as being in the 16:9 format. In embodiments, such control is achieved through operation of the control system 108, and/or through appropriate coding of transition macros.

Keyer Functionality

In an embodiment, the control system 108 includes a keyer for the 4:3 production path 110A, and a second keyer for the 16:9 production path 110B.

As will be appreciated, the output signals 112 comprise a composite of signals from multiple sources. For example, the output signals 112 may comprise a first video signal having a hole, or "key," cut therein. A second video signal is then inserted inside the key. The output signals 112 are thus a composite of the first video signal and the second video signal.

In the invention, the production system 102 includes video switchers to implement keying. The video switchers switch between multiple video sources (i.e., the first and second video signals from the above example). The switching operation of the video switchers is controlled by the control system 108, which is operating according to commands/instructions contained in transition macros.

A given transition macro includes commands for both the 4:3 format and the 16:9 format. For example, assume the user 104 inserts into a script the icon for a particular transition macro relating to keying. In an embodiment, the user 104 need pay no concern to whether the icon relates to the 4:3 format or the 16:9 format. Instead, the icon is associated with a transition macro that includes video commands to perform the keying function for both the 4:3 format and the 16:9 format, such that the outputs 112 are synchronized. In other words, the invention provides a user interface 106 that shields the user 104 from the complexities of the generation of dual outputs 112A, 112B in dual formats.

Adjustment of Effects

The control system 108 independently adjusts effects (such as DVE transitions like cuts, fades, wipes, etc.) for the desired look in a particular format (i.e., 4:3 or 16:9). This is achieved through transition macros. Specifically, a particular "cut" transition macro includes commands to effect the cut effect for the 4:3 format, and includes other commands to effect the cut effect for the 16:9 format. Such commands access either 4:3 format source materials, or 16:9 source materials, depending on whether the commands are for the 4:3 format or the 16:9 format. Such commands also have appropriate duration settings so the native 4:3 output 112A is synchronized with the native 16:9 output 112B.

Source Management

The invention achieves source management for to simultaneously generate the 4:3 output 112A and the 16:9 output 112B. The invention synchronizes and manages dual output control of video server ports for proper ingestion and processing in the system. The invention performs automated format detection to properly address source material that does not meet one or the other format. Therefore, the invention utilizes a number of processes to "letterbox" a 4:3 format or "crop" a 16:9 format for proper display.

In other words, the control system 108 must ensure that source materials are served to the 4:3 production path 110A and the 16:9 production path 110B such that the 4:3 output 112A is synchronized with the 16:9 output 112B. In one embodiment, the control system 108 issues control signals to simultaneously activate servers in the two production paths 110A, 110B. In this embodiment, the production paths 110A, 110B each have dedicated servers. In another embodiment, the production paths 110A, 110B share servers. In this embodiment, the control system 108 communicates with a shared server(s) to server materials to the production paths 110A, 110B in a synchronous manner.

Exact synchronization between the outputs 112 is not necessary. The goal of the invention is to align the outputs 112 with one another so differences are not easily discernable to the human eye.

The invention also performs automated format detection to properly address source material that does not meet one or the other format. For example, suppose in a show a particular source was available only in 4:3 format. In order to use this source in both the 4:3 production path 110A and the 16:9 production path 110B, the source would have to be converted to the 16:9 format. Accordingly, the invention automatically determines whether a given source is only available in certain formats (or, equivalently, whether a given source is not available in any formats of interest). The invention then automatically converts the source to the other formats, using any well known technique. Such conversion can be performed either pre-production, or during production.

Addressing Camera Sources

The invention addresses camera sources properly according to the respective formats (4:3 or 16:9).

In some embodiments, both 4:3 cameras and 16:9 cameras are utilized to produce the native 4:3 output 112A and the native 16:9 output 112B.

In other embodiments, only cameras of a single format are used, such as 16:9 cameras. The video output of such cameras are then adjusted (cropped) to form the 4:3 source material. As a result, source materials in both the 16:9 format and the 4:3 format are made available to the production paths 110A, 110B.

Cropping of the 16:9 video material into the 4:3 format takes into consideration the parameters of the 4:3 format, as well as the parameters of the show being produced. Accordingly, compositing the video materials to form the 4:3 output 112A and the 16:9 output 112B is enhanced, thereby increasing the quality of these output signals 112.

For example, consider the case where the script calls for a video signal to appear above and to the right of the anchor's shoulders. By knowing this ahead of time (during pre-production), the 16:9 original video signal can be cropped into the 4:3 format so that all the pertinent information will be conveyed in both the 16:9 output 112B, as well as the 4:3 output 112A.

User Interface

As clear from the description above, the user interface 106 enables users 104 to create scripts that, when executed by the control system 108, simultaneously generates the 4:3 output 112A and the 16:9 output 112B. Such dual format operation of the invention is transparent to the user 104. In other words, the user 104 does not need to explicitly design the script to achieve such dual format broadcasts. Instead, the invention utilizes transition macros that are coded for both formats, as described above.

The invention also supports "hot keys" that are coded for both formats. For example, the invention supports Late Breaking News keys, which when activated by the user 104 inserts into the script commands to accommodate a late breaking news segment. Hot keys are described in greater detail in U.S. Pat. No. 6,452,612, referenced above. According to the invention, such hot keys are associated with transition macros having instructions for both the 4:3 format and the 16:9 format.

Automated Real-Time Execution of Live Inserts of Repurposed Stored Content Distribution A method, system, and computer program product are provided for segmenting and marking digital video productions, such that all or segments of the production can be retrieved for a repurposed distribution over traditional mediums or computer networks, such as the Internet. As described in greater detail below, the present invention includes methodologies for removing or editing keyers, character generators, etc. The present invention enables one to change the order of the repurposed distribution or add segments from another production. The present invention also enables the insertion of advertisements and other information into the repurposed video stream.

Overview

Cable 24 hour news channels have found a niche for consumers looking for real time news information at the local/regional level. The 24-hour news channel model serves the community looking for updated news around the clock without having to wait for specific times as is typical of traditional broadcast local news. Traditional local broadcasters deliver live newscasts daily in the morning (5:00 AM-7:00 AM), afternoon (11:00 AM-1:00 PM), evenings (4:00 PM 6:00 PM) and late evening hours (10:00 PM-12:00 PM). The demand for local 24-hour news channels can be attributed to the different working hours and shifts associated with today's work environments along with the sense of immediacy that has been cultivated by the Internet.

In addition, in the not so distant future, local broadcasters will be able to participate in this market trend through the appropriate use of allocated digital bandwidth. The local broadcaster will be able to divide their digital bandwidth into multiple standard definition television (SDTV) channels that allows them to develop new applications. Local broadcasters in mid to large markets will take advantage of these channel opportunities to provide for new revenue applications such as 24-hour local news, local sports, local shopping and local education programming.

Two methods of deployment exist. One is to provide 24-hour "live" programming around the clock. Second, provide "live" programming when the "facts" change. In other words, a cable or local broadcaster can produce live content in the first ½ hour followed by a "repurposed" ½ hour on the back with live inserts for stories or events that require real time updates such as traffic and weather reports along with breaking news stories of events occurring in real time. Today, this is managed manually since the intelligence does not exist to automate this process. The manual process does not allow for true automated live inserts without many resources to manage the process.

Therefore a need exists to automate this process so that digital SDTV 24-hour programming channels can cost effectively produce content while the market develops. This will require a design that integrates the automated production environment with storage equipment intelligently including the ability to edit stories in real time during the production process while automatically maintaining a database and daily schedule at both the micro (story level) and macro (show level) resolution.

DETAILED DESCRIPTION

Figure 4:
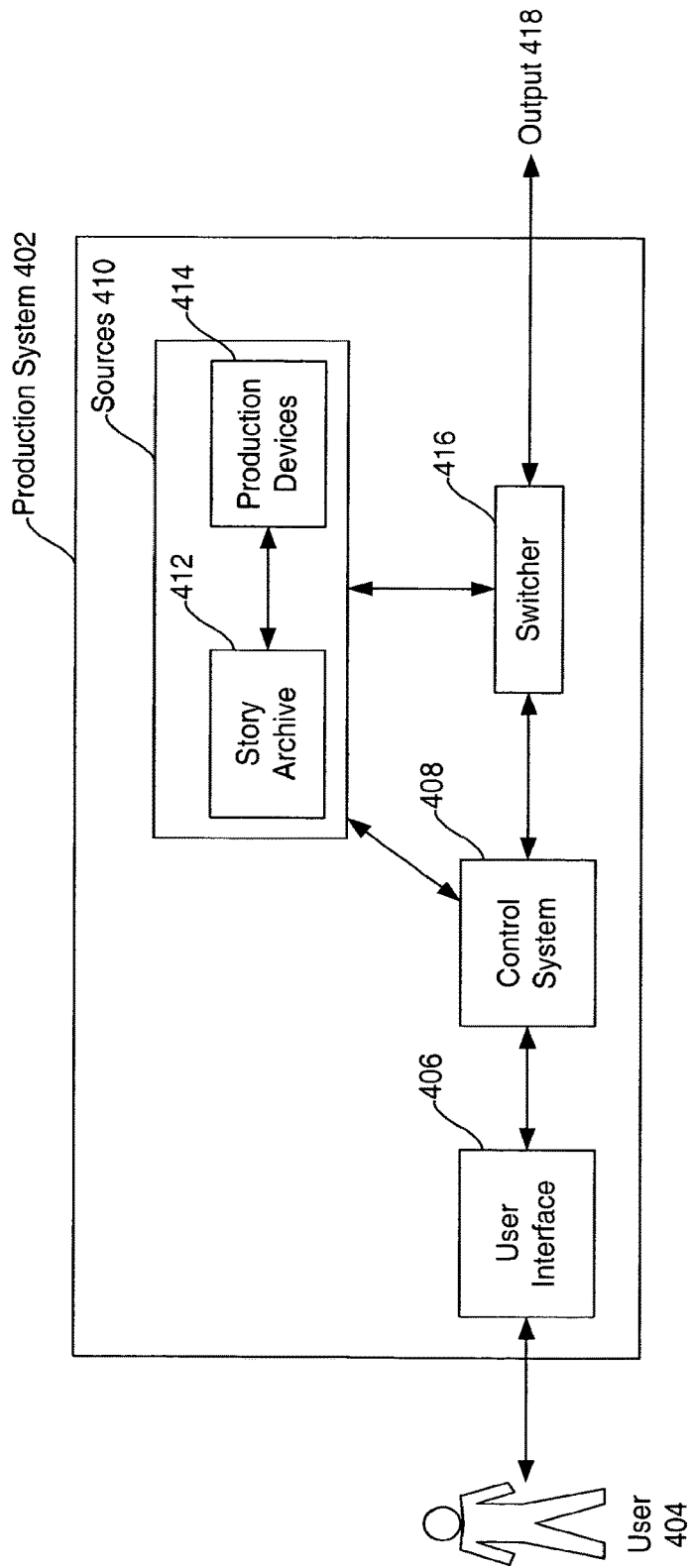
FIG. 4 is an example production system for producing shows using live content and re-purposed archived materials.

FIG. 4 is a production system 402 according to an embodiment of the invention. The production system 402 includes a user interface 406 for enabling interaction with users 404. The production system 402 also includes a control system 408 which is similar to the control system 108 described above. The control system 408 controls the production system 402 to achieve the functionality described herein.

The production system 402 includes a number of sources 410, including a story archive 412 and other production devices 414. The story archive 412 is a database having stored therein previously produced stories (although a "story" stored in this database may be any portion of a show). The production devices 414 are any known device for producing a show, such as a video switcher, camera, audio control, still store, tape machine, etc.

The production system 402 further includes one or more switchers 416, which receives sources 410 and is controlled by the control system 408. The switchers 416 generate an output 418, which in an embodiment represents a live or as-live show.

The production system 402 may be implemented using a production system as described in U.S. Pat. No. 6,452,612, referenced above.

Figure 2:
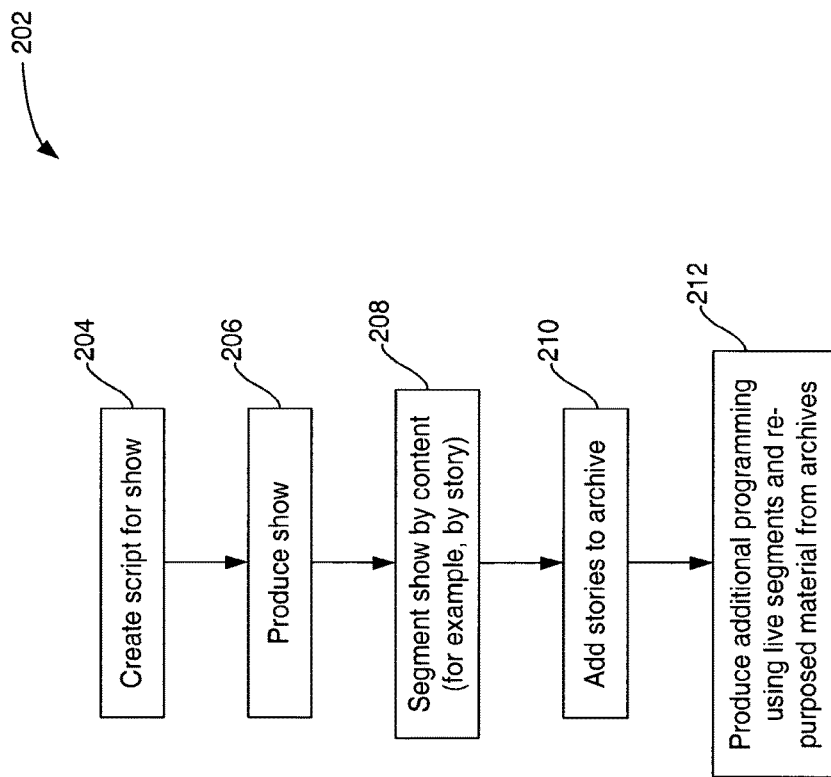
FIGS. 2 and 3 are example flowcharts depicting the operation of the invention when producing shows using live content and re-purposed archived materials.

FIG. 2 is a flowchart 202 representing the operation of the production system 402 according to an embodiment of the invention.

In step 204, the user 404 interacts with the user interface 406 to generate a script for the show that is to be produced. Such operation is described in detail in U.S. Pat. No. 6,452,612, referenced above.

In step 206, the production system 402 produces the show according to the script generated in step 204. Such operation is described in detail in U.S. Pat. No. 6,452,612, referenced above.

In step 208, the production system 402 segments the show (produced in step 206) according to some criteria. In an embodiment, the show is segmented according to content. Specifically, in an embodiment, the show is segmented according to story. Accordingly, in step 208, the production system 402 divides the show into its component stories.

In step 210, these stories are stored in the story archive 412, and indexed (or otherwise marked or tagged) for later retrieval.

In an embodiment, the production system 402 performs step 208 by recording the beginning and end of each story in the show, and/or the duration of each story. This information is stored, for example in the story archive 412, along with the show. Also stored is the story type or category of each story. Subsequently, the production system 402 can uniquely access any story in the show using this information (meta data).

It is noted that a "story" can be any portion of the show.

Further description regarding the segmentation of a show is provided in "Method, System and Computer Program Product for Producing and Distributing Enhanced Media Downstreams," Ser. No. 09/836,239, filed Apr. 18, 2001, referenced above.

Figure 3:
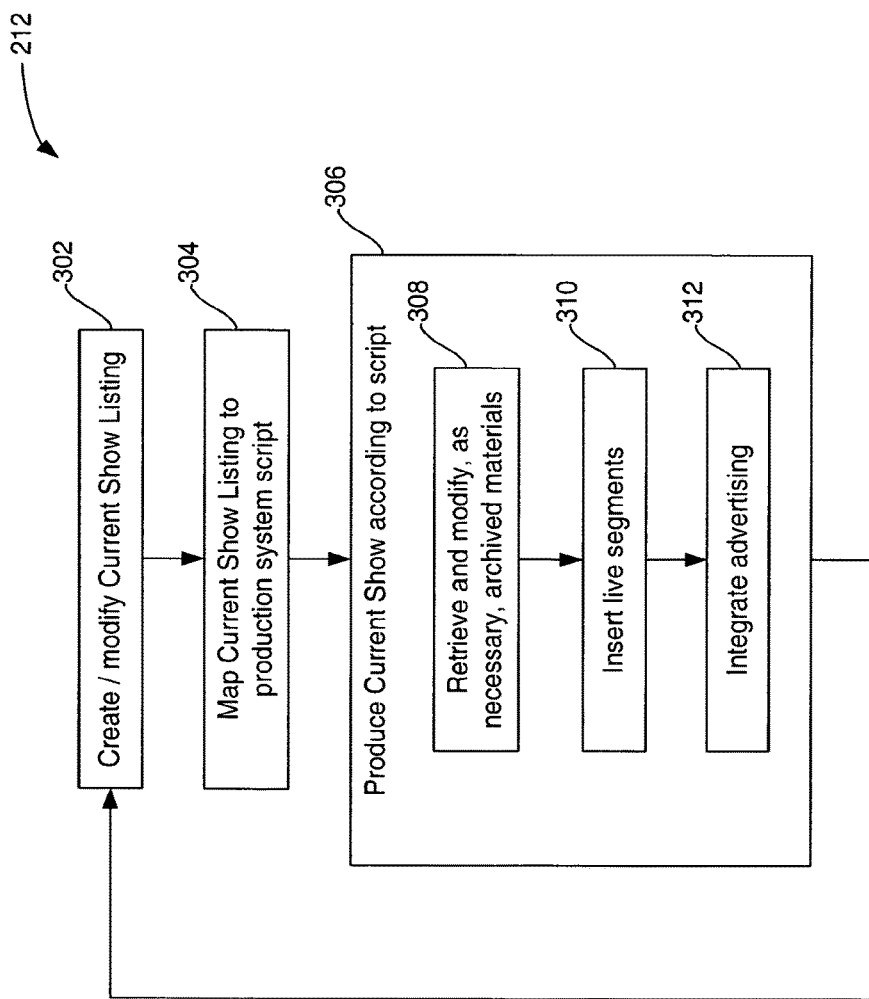

In step 212, the production system 402 generates additional programming, such as a new live or as-live show, using a combination of live inserts and archived material from the story archive 412. The live inserts are generated using the production devices 414. The material from the story archive 412 may be modified, if necessary, using the production devices 414. In some cases, the additional programming is comprised of only material from the story archive 412, although such materials may be modified to some extent. The operation of step 212 is shown in greater detail in FIG. 3, which shall now be considered.

Figure 5:
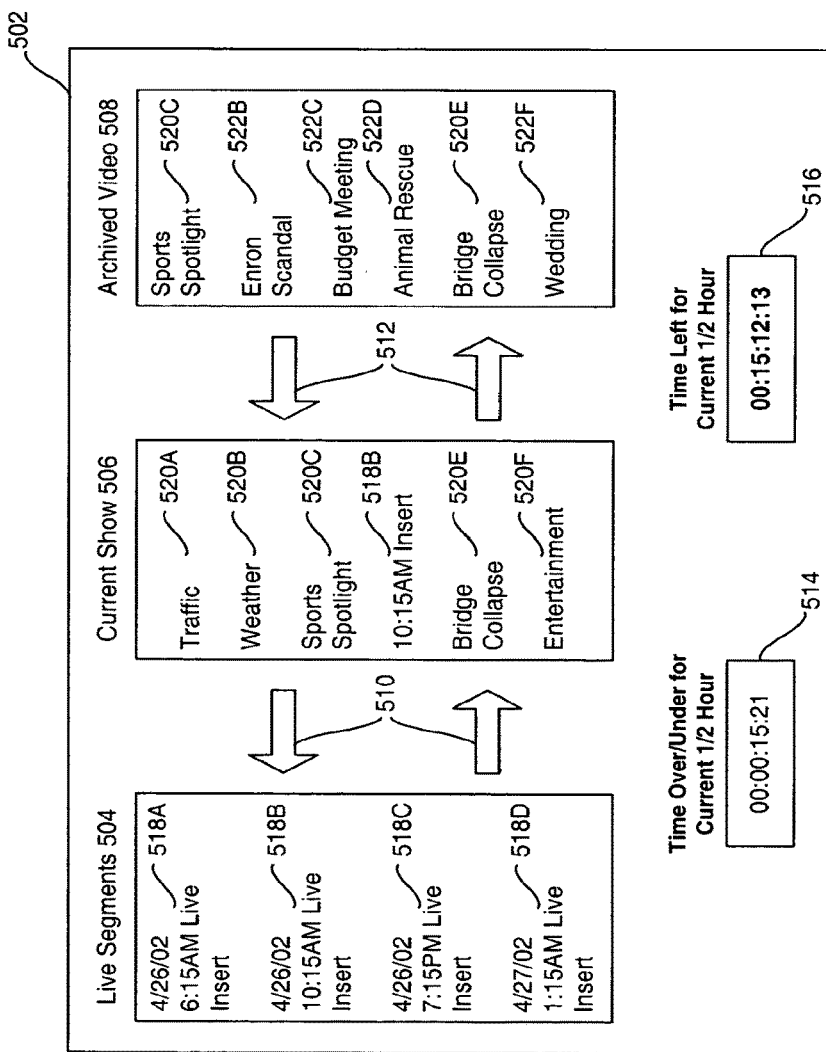
FIG. 5 is an example user interface for the production system of FIG. 4.

In step 302, the user 404 interacts with the production system 402 via the user interface 406 to create or modify a listing for a Current Show. The Current Show is a new show being designed for production using live inserts and material from the story archive 412. The listing lists the components of the Current Show. For example, FIG. 5 shows a Current Show Listing 506 having 6 components/segments/stories: a traffic report 520A, a weather report 520B, sports spotlight 520C, a live 10:15 AM insert 518B, a bridge collapse story 520E, and an entertainment segment 520F. Note that the sports spotlight 520C and the bridge collapse story 520E are from the story archive 412 (shown in the archived video window 508 of FIG. 5). The 10:15 AM insert 518B is a live insert (see the live segments window 504).

FIG. 5 illustrates an example user interface 502 (provided by the user interface 406 shown in FIG. 4) for enabling the user 404 to create and modify the Current Show Listing 506. The user 404 can drag and drop live segments from the live segment window 504, and/or archived stories from the archived video window 508. Within the current show window 506, the user 404 can use well known computer pointing techniques to arrange and order the components of the Current Show. Other user interfaces could alternatively be used, such as those described in U.S. Pat. No. 6,452,612 and/or pending U.S. application Ser. No. 09/836,239, referenced above.

In step 304, the production system 404 maps the Current Show Listing 506 to a production system script that comprises transition macros. Scripts and transition macros are described in detail in U.S. Pat. No. 6,452,612, as well as other patents and patent applications referenced above.

In step 306, the production system 404 produces the Current Show according to the Current Show Listing 506 and/or the script (from step 304). Step 306 includes steps 308, 310, and 312, which shall now be described.

In step 308, the production system 404 retrieves and modifies, as necessary, archived materials from the story archive 412, in accordance with the Current Show Listing 506. Such retrieved materials are inserted into the output 418 via the switcher 416.

Step 308 involves automatic "downstream" keyer changes for "as live" replay of the retrieved materials (as necessary). For example, supposed the retrieved materials include a "bug" (for example, a time and temperature overlay on top of the video). In this example, the production system 404 would cause the keyer (one of the production devices 414) to either eliminate the bug, or update the bug with the current time and temperature.

In an embodiment, step 308 is achieved by modifying the retrieved materials, in the manner just described. In an alternative embodiment, this is achieved by not recording the bug in the materials when the materials were originally produced (in step 206). In this embodiment, the bug is inserted into the output 418 in real-time.

In step 310, the production system 404 generates live segments in accordance with the Current Show Listing 506. Such live segments are inserted into the output 418 via the switcher 416.

Note that the user interface 502 includes a Time Over/Under for Current ½ Hour timer 514, which indicates the amount of time that the show is over/under given the stories already aired and the stories that are yet to be aired, and a Time Left for Current ½ Hour timer 516, which indicates the time remaining in the 30 minute show (these counters 514, 516 are based on a 30 minute show). These counters 514, 516 are used by the director 404 to ensure that the show fits into the allotted time (i.e., 30 minutes in the example of FIG. 5). The director 404 can control the length of any live segments to ensure that the show fits within the 30 minute slot. Alternatively, the director 404 can select other archived materials from the story archive 412 based on duration of such materials to ensure the show fits within the allotted slot. Manipulation of the Current Show Listing 506 in this manner is described in greater detail in "Method, System and Computer Program Product for Producing and Distributing Enhanced Media Downstreams," Ser. No. 09/836,239, filed Apr. 18, 2001, referenced above (in the context of an approval application, system, method, and computer program product).

In step 312, the production system 402 inserts advertisements into the output stream 418. In an embodiment, the ads are "searched" to import the light ad with the correct duration, and possibly content. In other words, based on the scheduled "break" length, and/or the content of stories around the break, commercials of corresponding duration will be accessed and inserted into the output stream 418.

As the Current Show is produced, some segments may run longer or shorter than originally expected. The production system 402 keeps track of the overage or underage, and may adjust the duration of commercial breaks to compensate for such overage/underage. If the duration(s) of the commercial breaks change, then the production system 402 selects and inserts into the output stream 418 combination(s) of commercials that fit the duration of the breaks. Other aspects involving the selection of commercials are described in "Advertisement Management Method, System, and Computer Program Product," Ser. No. 10/247,783, filed Sep. 20, 2002, referenced above.

Media Manager

Figure 6:
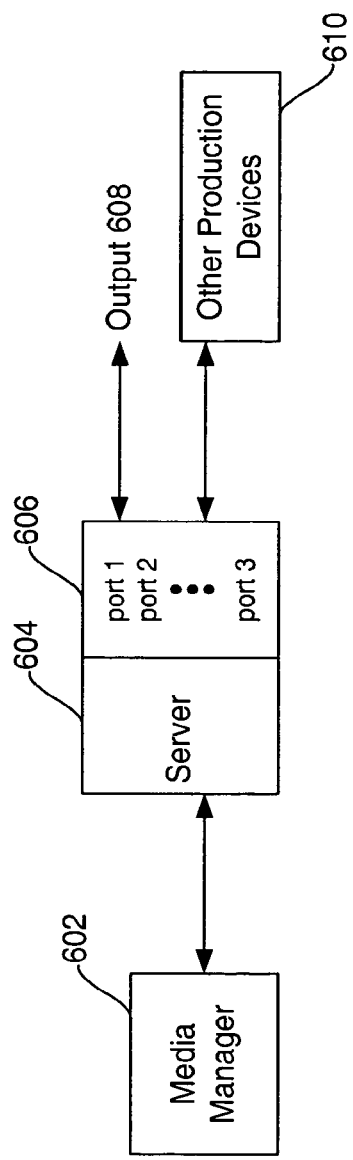
FIG. 6 is a block diagram of a media manager according to an embodiment of the invention.

FIG. 6 is a block diagram showing a media manager 602 and a server 604 according to an embodiment of the invention. The media manager 602 and server 604 are optionally part of the production systems 102, 402 shown in FIGS. 1 and 4, for example.

The media manager 602 manages the selection, play out status, play out channel assignment of both video clips and graphic files from the server 604.

The media manager 602/server 604 combination has a number of features:

Media Types: The combination combines the management of a video server, still store, and character generator under one software interface. The media may consist of video and key. The key can be linked with the video for play out.

Integrated server: In an embodiment, the server 604 is an integrated server that is capable of internally keying media, with key signals, and outputting the composite media out a single channel.

Clip & Graphic Selection: The Media Manager 602 interfaces with user interfaces 106, 406 to allow the user 104, 404 to brow a low-resolution image of video clips and graphic files available in the server 604. These clip or graphic Id's can then be assigned to a particular story within the rundown. Non-integrated servers may only be able to export a list of clip or graphic id's available for selection.

Play out Status: The Media Manager 602 updates the status of a clip assigned to a particular story. When a clip is assigned to a particular story within the rundown, the Media Manager 602 tracks the air readiness of that particular clip. If a predefined graphic Id were entered into the rundown that does not exist, Media Manager 602 would notify the rundown that the graphic requested is not air ready.

When the production system 102, 402 monitors a rundown, a list of clips and graphics is generated under each story slug. If a clip or graphic is not air ready, the text is colored red. The status of the clip or graphic is automatically updated, until the rundown is unmonitored. When a list item that is colored red, becomes air ready, the text is changed to black.

Auto Assign Play out Channels: When a particular story is previewed for air, Media Manager 602 automatically assigns the clips and graphics on an available play out channel (video & key) from a pool of channels. There are two parts to the channel assignment. Part one loads the media to the auto-assigned channel. Part two routes the auto-assigned channel to the proper background or key channel. (Channels on-air and requested channels for preview cannot exceed the total number of channels for the system.)

The media manager 602 and server 604 shall now be described in greater detail.

As noted above, in an embodiment, the server 604 is an integrated server. The media manager 602 communicates and interacts with the server 604 in the server 604's native language, such that the media manager 602 is capable of accessing additional functionality of the server 604.

The media manager 602 manages the play-out of server clips and still devices. The media manager 602 controls what channels (ports) 606 of the server 604 these play out, and will ascertain if the clip exists or docs not exist. When a particular clip on the script comes up to be output, the media manager 606 automatically assigns the channel that it will be played out on, from the pool of channels that exist. This process is called auto-channeling.

For example, suppose the production system 102, 402 is processing a "load media" command from a transition macro. According to the invention, the media manager 602 automatically finds the next unused port 606 of the server 604, and uses that port 606 to output the media from the server 604. In other words, the port 606 of the server 604 need not be hard-coded into the "load media" command.

There are various benefits of auto-channeling. First, if the server port must be hard-coded into transition macros, then the library of transition macros becomes very large (for example, there must be a transition macro for each function/port combination). With auto-channeling, only a single transition macro for a given function is needed, since the channel 606 of the server 604 that is going to be used is automatically determined by the media manager 602 when the command is executed. Second, auto-channeling greatly simplifies user operation, since the user need not be concerned with specifying the server port to use. Instead, the user can focus on selecting and ordering the transition macros in order to produce the desired show.

It is noted that the media manager 602 can operate with non-integrated, commercially available servers. In this case, it is necessary to produce a configuration file or otherwise inform the media manager 602 of the number and configuration of the server's ports/channels.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A media production and distribution system for generating video content for playout in multiple aspect ratios, the production system comprising:
   a media content generator configured to generate a first media content segment configured for media consumption and playout in a first aspect ratio;
   a media content format converter configured to automatically crop the first media content segment to create a second media content segment configured for media consumption and playout in a second aspect ratio different than the first aspect ratio;
   a media effect controller configured to independently adjust a first transition effect of the first media content segment based on the first aspect ratio and a second transition effect of the second media content based on the second aspect ratio;
   a first production channel and a second production channel different from the first production channel; and
   a media content manager configured to transmit the first media content segment over a first distribution channel for consumption and playout on a first media consumption device in the first aspect ratio and to transmit the second media content segment over a second distribution channel for consumption and playout on a second media consumption device in the second aspect ratio,
   wherein the media content generator is configured to control the first production channel to produce the first media content segment in the first aspect ratio, and to control the second production channel to produce the second media content segment in the second aspect ratio,
   wherein each of the first and second transition effects comprises at least one of a cut transition, a fade transition, and a wipe transition based on the first and second aspect ratios, respectively, and
   wherein the first aspect ratio is one of a 4:3 aspect ratio and a 16:9 aspect ratio and the second aspect ratio is the other of the 4:3 aspect ratio and the 16:9 aspect ratio.

2. The media production and distribution system according to claim 1, wherein the media content manager comprises a server including a processor configured to select respective first and second ports of a plurality of ports for transmitting the first and second media content segments over the first and second distribution channels, respectively.

3. The media production and distribution system according to claim 2, wherein the processor comprises a hardware processor that, when executes software, configures the media content format converter to automatically crop the first media content segment to create the second media content segment.

4. The media production and distribution system according to claim 1, wherein the media content manager is configured to simulcast the first and second media content segments over the first and the second distribution channels, respectively.

5. The media production and distribution system according to claim 4, wherein the media content manager is configured to align outputs of the first and second media content segments when simulcast over the first and the second distribution channels, respectively.

6. The media production and distribution system according to claim 1, wherein the media effect controller is configured to generate a user interface configured to receive an insertion of a transition macro into a script and to perform a function associated with the transition macro in generating the first media content segment in the first aspect ratio and the second media content segment in the second aspect ratio.

7. A media production and distribution system for generating video content for playout in multiple aspect ratios, the production system comprising:
   a media content generator configured to generate a first media content segment configured for media consumption and playout in a first aspect ratio;
   a media content format converter configured to automatically crop the first media content segment to create a second media content segment configured for media consumption and playout in a second aspect ratio different than the first aspect ratio; and
   a media content manager configured to transmit the first media content segment over a first distribution channel for consumption and playout on a first media consumption device in the first aspect ratio and to transmit the second media content segment over a second distribution channel for consumption and playout on a second media consumption device in the second aspect ratio.

8. The media production and distribution system according to claim 7, further comprising:
   a first production channel and a second production channel different from the first production channel,
   wherein the media content generator is configured to control the first production channel to produce the first media content segment in the first aspect ratio, and to control the second production channel to produce the second media content segment in the second aspect ratio.

9. The media production and distribution system according to claim 7, further comprising:
   a media effect controller configured to independently adjust a first transition effect of the first media content segment based on the first aspect ratio and a second transition effect of the second media content based on the second aspect ratio,
   wherein each of the first and second transition effects comprises at least one of a cut transition, a fade transition, and a wipe transition based on the first and second aspect ratios, respectively.

10. The media production and distribution system according to claim 9, wherein the media effect controller is configured to generate a user interface configured to receive an insertion of a transition macro into a script and to perform a function associated with the transition macro in generating the first media content segment in the first aspect ratio and the second media content segment in the second aspect ratio.

11. The media production and distribution system according to claim 7, wherein the media content manager comprises a server including a processor configured to select respective first and second ports of a plurality of ports for transmitting the first and second media content segments over the first and second distribution channels, respectively.

12. The media production and distribution system according to claim 11, wherein the processor comprises a hardware processor that, when executes software, configures the media content format converter to automatically crop the first media content segment to create the second media content segment.

13. The media production and distribution system according to claim 7, wherein the media content manager is configured to simulcast the first and second media content segments over the first and the second distribution channels, respectively.

14. The media production and distribution system according to claim 13, wherein the media content manager is configured to align outputs of the first and second media content segments when simulcast over the first and the second distribution channels, respectively.

15. The media production and distribution system according to claim 7, wherein the first aspect ratio is one of a 4:3 aspect ratio and a 16:9 aspect ratio and the second aspect ratio is the other of the 4:3 aspect ratio and the 16:9 aspect ratio.

16. A media production and distribution system for generating video content for playout in multiple aspect ratios, the production system comprising:
    a media content format converter configured to automatically convert at least one media content segment from a first production format in a first aspect ratio to a second production format in a second aspect ratio different than the first aspect ratio; and
    a media content manager configured to transmit the at least one media content segment in the first production format over a first distribution channel for consumption and playout on a first media consumption device in the first aspect ratio and to transmit the at least one media content segment in the second production format over a second distribution channel for consumption and playout on a second media consumption device in the second aspect ratio.

17. The media production and distribution system according to claim 16, further comprising:
    a first production channel and a second production channel different from the first production channel,
    wherein the media content format converter includes a media content generator configured to control the first production channel to produce the at least one media content segment in the first production format, and to control the second production channel to produce the at least one media content segment in the second production format.

18. The media production and distribution system according to claim 16, wherein the media content format converter is configured to crop the at least one media content segment in the first production format to create the at least one media content segment in the second production format configured for media consumption and playout in the second aspect ratio.

19. The media production and distribution system according to claim 18, wherein the first aspect ratio is one of a 4:3 aspect ratio and a 16:9 aspect ratio and the second aspect ratio is the other of the 4:3 aspect ratio and the 16:9 aspect ratio.

20. The media production and distribution system according to claim 16, further comprising:
    a media effect controller configured to independently adjust a first transition effect of the at least one media content segment in the first production format based on the first aspect ratio and a second transition effect of the at least one media content in the second production format based on the second aspect ratio,
    wherein each of the first and second transition effects comprises at least one of a cut transition, a fade transition, and a wipe transition based on the first and second aspect ratios, respectively.

21. The media production and distribution system according to claim 20, wherein the media effect controller is configured by a plurality of transition macros, with the plurality of transition macros comprising a first set of instructions for causing a first production path to perform a first function based on the first aspect ratio, and a second set of instructions for causing a second production path to perform a second function based on the second aspect ratio, the first production path being different from the second production path.

22. The media production and distribution system according to claim 20, wherein the media effect controller is configured to generate a user interface configured to receive an insertion of a transition macro into a script and to perform a function associated with the transition macro in generating the at least one media content segment in the first production format and the at least one media content segment in the second production format.

23. The media production and distribution system according to claim 16, wherein the media content manager comprises a server including a processor configured to select respective first and second ports of a plurality of ports for transmitting the at least one media content segments in the first and second production formats over the first and second distribution channels, respectively.

24. The media production and distribution system according to claim 23, wherein the processor comprises a hardware processor that, when executes software, configures the media content format converter to automatically crop the first media content segment to create the second media content segment.

25. The media production and distribution system according to claim 16, wherein the media content manager is configured to simulcast the at least one media content segment in the first and second production formats over the first and the second distribution channels, respectively.

26. The media production and distribution system according to claim 25, wherein the media content manager is configured to align outputs of the respective at least one media content segment when simulcast over the first and the second distribution channels, respectively.

* * * * *